United States Patent
Wakabayashi et al.

(10) Patent No.: US 7,063,196 B2
(45) Date of Patent: Jun. 20, 2006

(54) DRY MULTI-DISC CLUTCH

(75) Inventors: Shinya Wakabayashi, Saitama (JP); Yoshinobu Shiomi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 10/813,610

(22) Filed: Mar. 30, 2004

(65) Prior Publication Data

US 2004/0206595 A1 Oct. 21, 2004

(30) Foreign Application Priority Data

Apr. 4, 2003 (JP) ............................. 2003-102203

(51) Int. Cl.
*F16D 13/72* (2006.01)
*F16D 13/52* (2006.01)

(52) U.S. Cl. ............................. 192/70.12; 192/113.23
(58) Field of Classification Search ........... 192/113.23, 192/113.24, 113.26
See application file for complete search history.

(56) References Cited

U.S. PATENT DOCUMENTS

| | | | | |
|---|---|---|---|---|
| 1,601,235 A | * | 9/1926 | Bullard, Jr. et al. ..... | 192/70.12 |
| 1,635,353 A | * | 7/1927 | Alley ...................... | 192/113.23 |
| 1,707,843 A | | 4/1929 | Byertein | |
| 1,731,416 A | * | 10/1929 | Gurney .................. | 192/113.24 |
| 1,742,804 A | * | 1/1930 | Carhart .................. | 192/113.23 |
| 2,115,763 A | * | 5/1938 | Burke .................... | 192/113.23 |
| 4,529,074 A | * | 7/1985 | Alas ...................... | 192/70.12 |
| 5,421,438 A | * | 6/1995 | Flotow et al. ........... | 192/70.12 |
| 5,421,458 A | | 6/1995 | Campbell | |
| 6,129,191 A | * | 10/2000 | Kummer et al. ......... | 192/70.12 |

FOREIGN PATENT DOCUMENTS

| | | | |
|---|---|---|---|
| DE | 4443791 | | 6/1995 |
| DE | 19930966 | | 1/2001 |
| DE | 10110897 | | 9/2001 |
| JP | 59-13129 A | * | 1/1984 |
| JP | 3-189419 A | * | 8/1991 |
| JP | 03249335 | | 11/1991 |
| JP | 5-106642 A | * | 4/1993 |
| JP | 07-319755 | | 12/1995 |

* cited by examiner

*Primary Examiner*—Rodney H. Bonck
(74) *Attorney, Agent, or Firm*—Carrier, Blackman & Associates, P.C.; William D. Blackman; Joseph P. Carrier

(57) ABSTRACT

A dry multi-disc clutch includes a plurality of friction discs interposed between a drive-side clutch outer and a driven-side clutch center and power is transmitted from the clutch outer to the clutch center by pushing these friction discs using a pressure plate. Fins which enhance a flow of air are formed on the clutch outer and the pressure plate and, at the same time, passages which allow the communication of air are formed in the clutch outer and the pressure plate. With such a clutch structure it is possible to efficiently radiate the friction heat, which is generated when the clutch is connected, and the heat transmitted from the engine and, at the same time, it is possible to discharge the wear powder that is generated when the clutch is connected. As a result, it is possible to stabilize the clutch performance.

8 Claims, 10 Drawing Sheets

Rr ⟵⟶ Fr

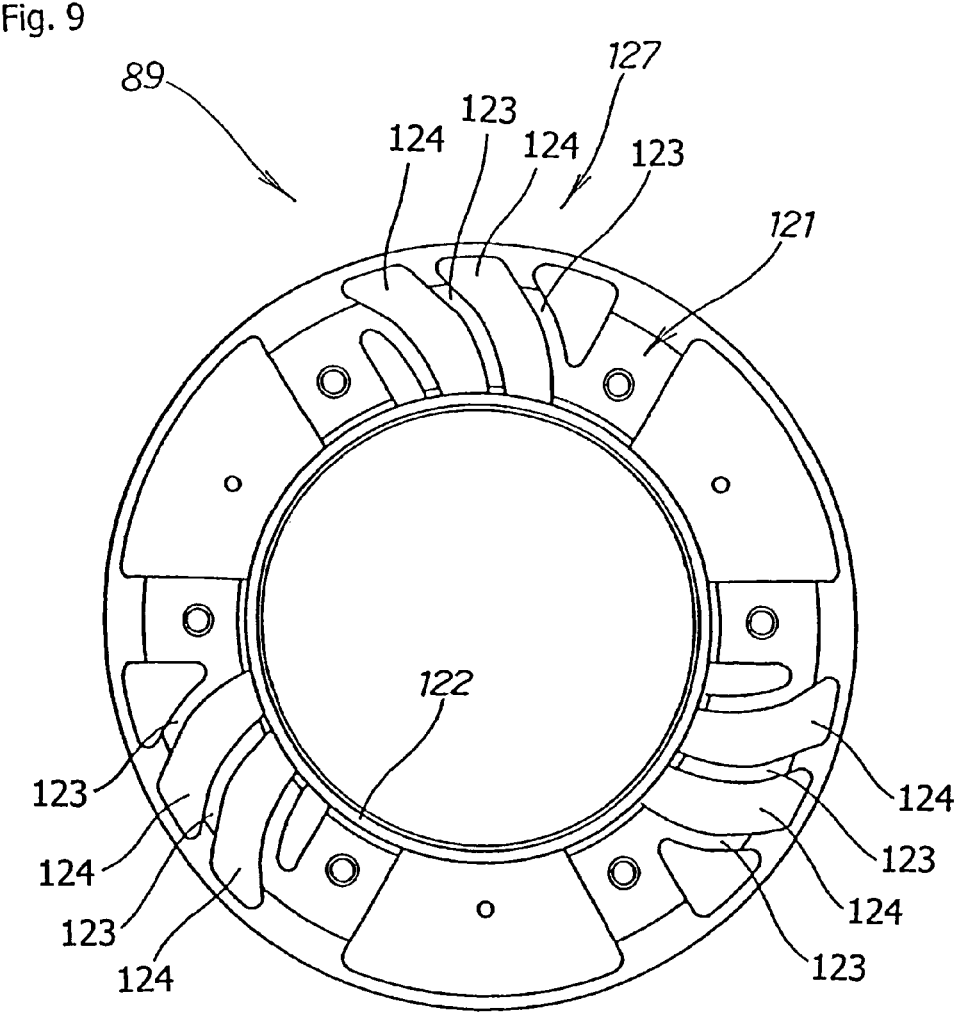

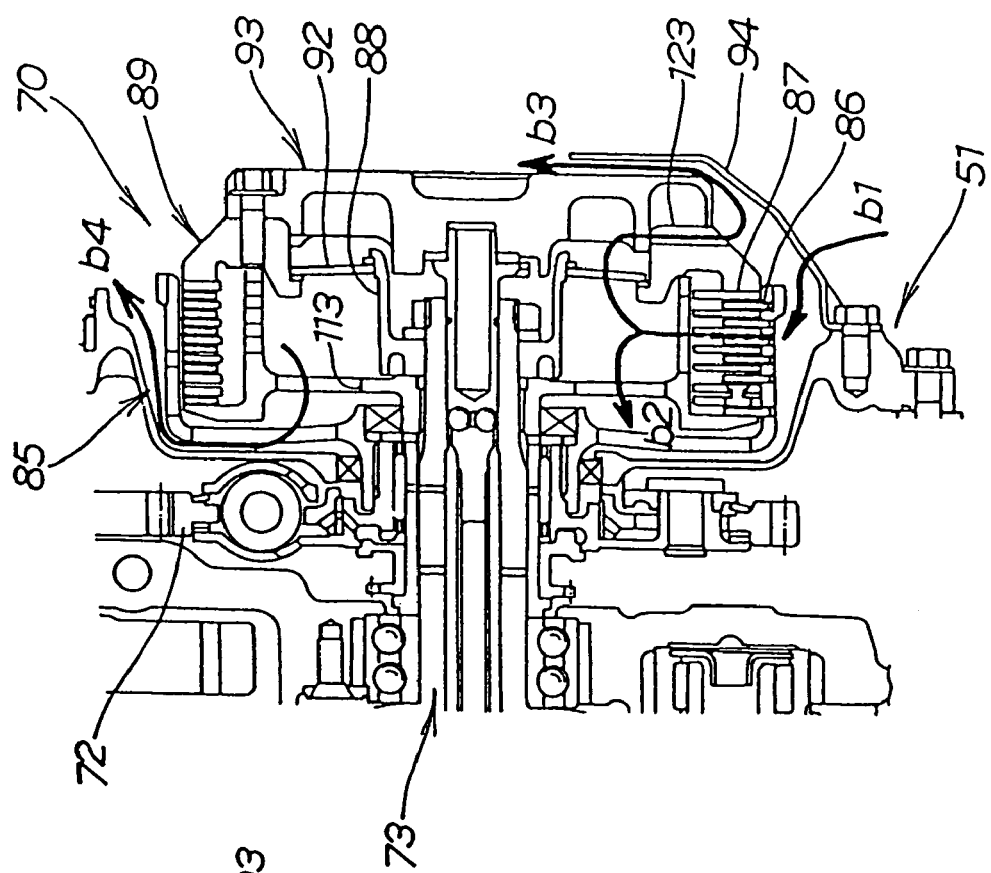
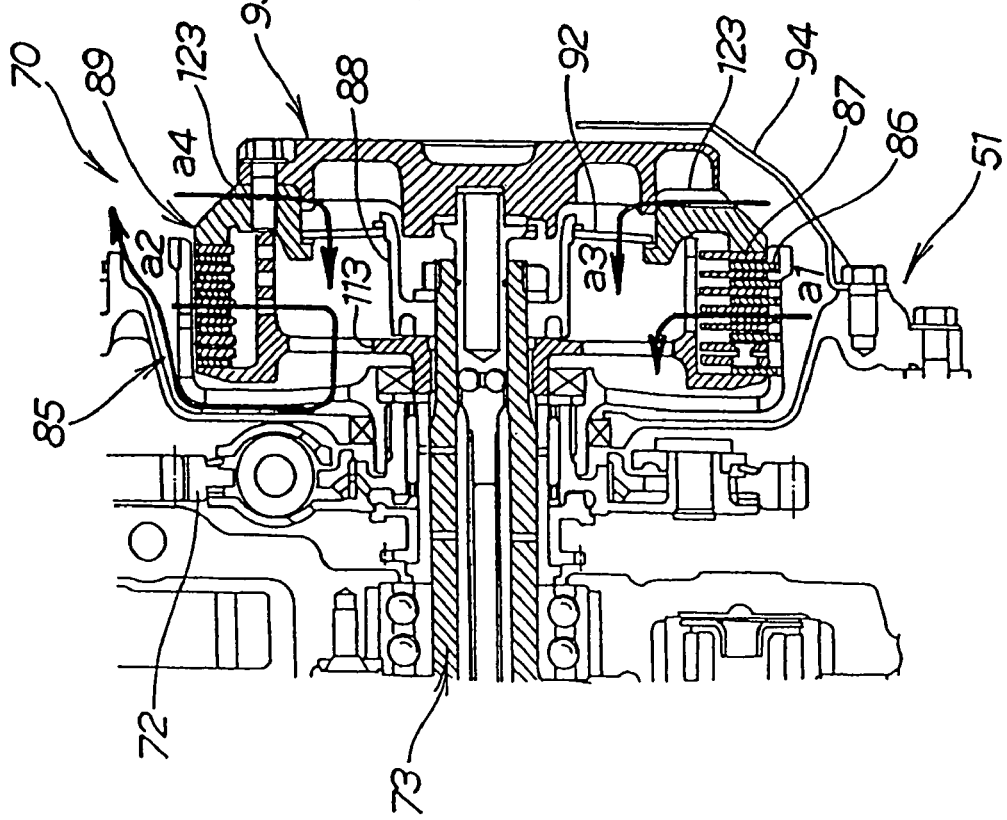
Fig. 10(a)
Fig. 10(b)

PRIOR ART

DRY MULTI-DISC CLUTCH

CROSS-REFERENCE TO RELATED APPLICATIONS

The present invention claims priority under 35 USC 119 based on Japanese patent application No. 2003-102203, filed Apr. 4, 2003.

FIELD OF THE INVENTION

The present invention relates to a dry multi-disc clutch for transmitting power from an engine or cutting off the transmission of the power.

DESCRIPTION OF THE BACKGROUND ART

There has been known a dry multi-disc clutch that is arranged in the midst of the transmission of power from a crankshaft to wheels for transmitting the power or cutting off the transmission of the power (see Japanese Patent Publication 2864396 (page 6, FIG. 3), for example).

FIG. 3 of the above-mentioned publication is reproduced here and the above-mentioned technique is explained in conjunction with the drawing. However, symbols described in the publication are renumbered and names of parts described in the publication are partially changed.

FIG. 11 is a reproduced drawing of FIG. 3 of the Japanese Patent Publication 2864396. A dry multi-disc clutch 220 is a clutch which is substantially constituted of a primary gear 222 which transmits power of a crankshaft 221, a clutch outer 223 which is in a spline engagement with the primary gear 222, a plurality of drive-side friction discs 224 which are engaged with the clutch outer 223, driven-side friction discs 225 which are alternately overlapped to these drive-side friction discs 224, a clutch center 226 with which the driven-side friction discs 225 are engaged, a main shaft 227 which is mounted on the clutch center 226, and a pressure plate 228 which enables the transmission of power from the clutch outer 223 to the clutch center 226 by pushing the drive-side friction discs 224 and the driven-side friction discs 225.

However, in the above-mentioned dry multi-disc clutch 220, the friction heat which is generated when the drive-side friction discs 224 and the driven-side friction discs 225 are made to push each other using the pressure plate 228 and the heat transmitted from the engine (not shown in the drawing) are liable to be accumulated in the inside of the dry multi-disc clutch 220. That is, a technique that can efficiently radiate the friction heat generated by the dry multi-disc clutch 220 and the heat transmitted from the engine is required.

Further, it is also desirable to sequentially discharge wear powder which is generated from the drive-side friction discs 224, the driven-side friction discs 225 and the like when the drive-side friction discs 224 and the driven-side friction discs 225 are pushed by the pressure plate 228 to the outside.

Accordingly, it is an object of the present invention to provide a dry multi-disc clutch which can efficiently radiate the friction heat generated in the inside of the clutch and the heat transmitted from an engine and, at the same time, can discharge wear power which is generated in the inside of the clutch.

SUMMARY OF THE INVENTION

To achieve the above-mentioned object, according to a first aspect of the present invention there is provided a dry multi-disc clutch in which a plurality of friction discs are interposed between a drive-side clutch outer and a driven-side clutch center and power is transmitted from the clutch outer to the clutch center by pushing the friction discs using a pressure plate, fins which enhance a flow of air are formed on at least one of the clutch outer and the pressure plate and passages which allow the communication of air are formed in the clutch outer and the pressure plate.

Such a dry multi-disc clutch according to the invention is very advantageous because the efficient radiation of the friction heat 1 which is generated when the clutch is connected, as well as the heat transmitted from the engine and, at the same time, the realization of discharge of wear powder which is generated when the clutch is connected 1 are desirable in view of the stabilization of the clutch performance.

Accordingly, the fins which enhance the flow of air are formed on the clutch outer and/or the pressure plate and, at the same time, passages which allow the communication of air are formed in the clutch outer and the pressure plate.

That is, by forming the fins which enhance the flow of air on the clutch outer and/or the pressure plate and, at the same time, by forming openings or passages which allow the communication of air in the clutch outer and the pressure plate, it is possible to efficiently radiate the friction heat plate, which is generated when the clutch is connected and the heat transmitted from the engine and, at the same time, it is possible to discharge the wear powder which is generated when the clutch is connected. As a result, it is possible to stabilize the clutch performance.

According to a second aspect of the present invention, the fins are formed on the clutch outer. By forming the fins on the clutch outer, it is possible to radiate the friction heat and to discharge the wear powder to an external space at the clutch outer side. For example, this constitution is advantageous in the arrangement that defines a large space at the clutch outer side.

According to a third aspect of the present invention, the fins are formed on the pressure plate. By forming the fins on the pressure plate, it is possible to radiate the friction heat and to discharge the wear powder to an external space at the pressure plate side. For example, this constitution is advantageous in the arrangement that defines a large space at the pressure plate side.

According to a fourth aspect of the present invention, the clutch outer and the pressure plate are disposed outside a crankcase of an engine. By disposing the clutch outer and the pressure plate outside the crankcase of the engine, it is possible to arrange the whole clutch in a spaced-apart manner from the crankcase of the engine. As a result, it is possible to make the dry multi-disc clutch have the structure that hardly receives the influence of the heat from the engine.

According to a fifth aspect of the present invention, the fins are formed into a fin shape with which the fins constitute either an axial fan or a centrifugal fan. By constituting the axial fan using the fins, it is possible to enhance the radiation of heat when the clutch outer or the pressure plate is rotated at a low speed. Further, by constituting the centrifugal fan using the fins, it is possible to enhance the radiation of heat when the clutch outer or the pressure plate is rotated at a high speed.

According to a sixth aspect of the present invention, the fins are formed at the clutch outer side into the fin shape with which the fins constitute the axial fan. It is generally known that the axial fan exhibits the favorable air discharge efficiency at the time of low-speed rotation and hence, by forming the fins at the clutch outer side into the fin shape with which the fins constitute the axial fan, it is possible to enhance the radiation of heat when the clutch outer is rotated at a low speed. That is, the clutch outer is a member which is always rotated during starting of the engine and hence, it is possible to enhance the radiation of heat of the inside of the clutch particularly at the time of idling when the engine is rotated at a low speed.

According to a seventh aspect of the present invention, the fins are formed at the pressure plate side into the fin shape with which the fins constitute the centrifugal fan. It is generally known that the centrifugal fan exhibits the favorable air discharge efficiency at the time of high-speed rotation and hence, by forming the fins at the pressure plate side into the fin shape with which the fins constitute the centrifugal fan, it is possible to enhance the radiation of heat when the pressure plate is rotated at a high speed. That is, the pressure plate is rotated during cruising and hence, it is possible to enhance the radiation of heat of the inside of the clutch particularly during cruising when the engine is rotated at a high speed.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 9 is a view as viewed in an arrow direction indicated by 9 in FIG. 7.

FIGS. 10(a), 10(b) are operation explanatory views of the dry multi-disc clutch according to the present invention.

DESCRIPTION OF THE INVENTION

Figure 1:
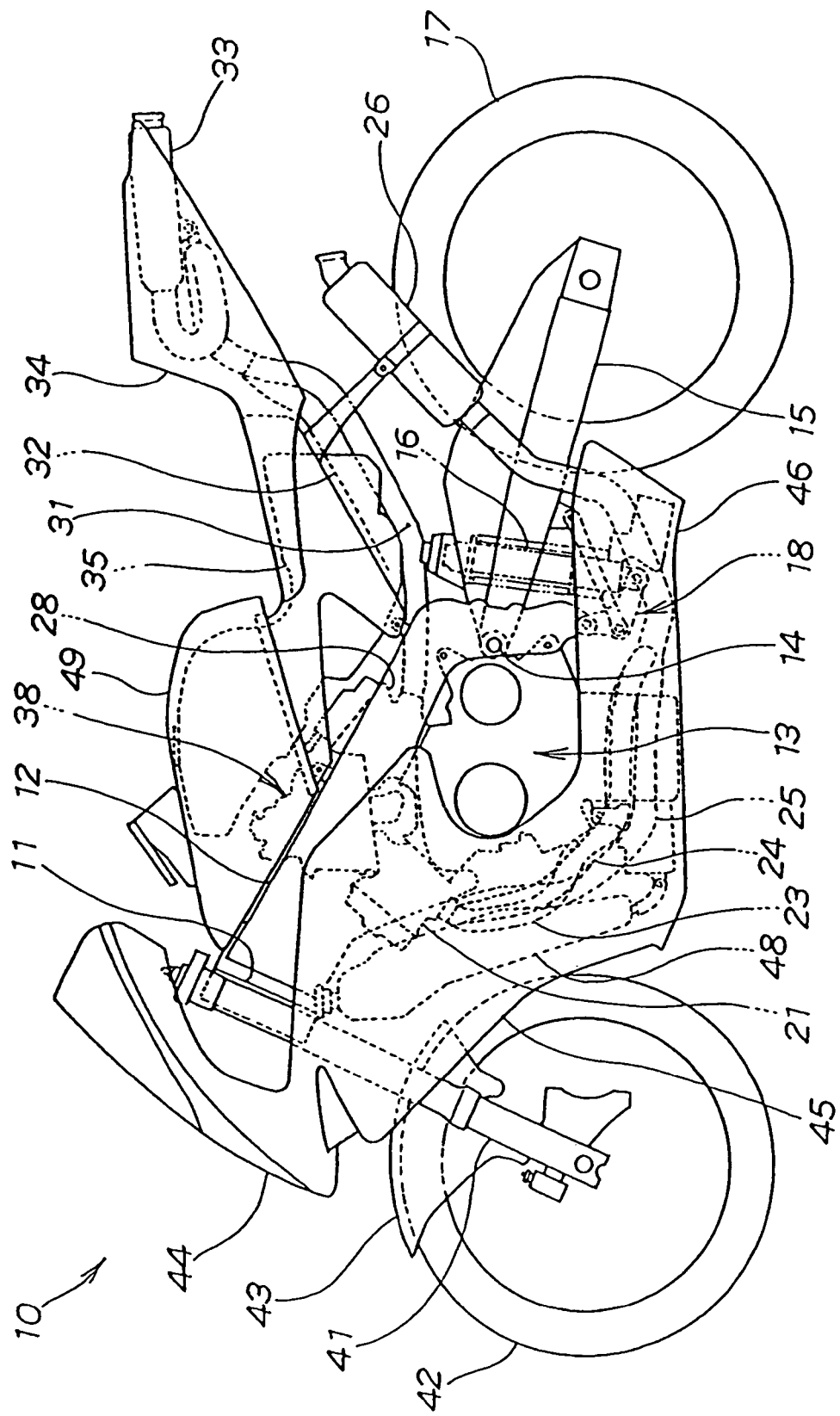
FIG. 1 is a left side view of a motorcycle that adopts an embodiment of an accessory-use cover structure according to the present invention.

FIG. 1 is a left side view of a motorcycle that adopts the accessory-use cover structure according to the present invention. The motorcycle 10 constitutes a vehicle that has a following constitution. A pair of left and right body frames (main frames) 12, 12 that constitute a vehicle body extend in the downward oblique direction toward a rear portion of the vehicle body from a head pipe 11 (only the symbol which indicates the body frame 12 at a viewer side shown on the drawing). A V-type 5-cylinder engine 13 (hereinafter abbreviated as "engine 13") is mounted on lower portions of the body frames 12, 12 and, at the same time, a swing arm 15 is mounted on rear portions of the body frames 12, 12 by means of a pivot shaft 14 such that the swing arm 15 is swingable upwardly and downwardly. An upper end of a rear cushion unit 16 is mounted on a front upper portion of the swing arm 15 and, at the same time, a rear wheel 17 is mounted on a rear end portion of the swing arm 15. A lower end of the rear cushion unit 16 is mounted on a rear lower end portion of the body frame 12 by way of a link device 18. Exhaust pipes 23 to 25 which are provided for respective cylinders are extended rearwardly from cylinder heads 21 mounted on a front side of the engine 13 and these exhaust pipes 23 to 25 are once merged and, thereafter, are connected to a left muffler 26 at a viewer side on the drawing. Exhaust pipes 31, 32 that are provided for respective cylinders are extended rearwardly from cylinder heads 28 mounted on a rear side of the engine 13 and these exhaust pipes 31, 32 are once merged and, thereafter, are connected to a rear muffler 33 mounted on the rear portion of the vehicle body. A seat cowl 34 which also functions as a seat is extended rearwardly from upper portions of the body frames 12, 12 and a fuel tank 35 is mounted on the inside of the seat cowl 34.

Here, the engine 13 is configured such that a throttle body assembly 38 is mounted between the cylinder heads 21, 28. In the drawing, numeral 41 indicates a front fork which is rotatably mounted on the head pipe 11, numeral 42 indicates a front wheel mounted on a lower end of the front fork 41, numeral 43 indicates a front fender which covers the front wheel 42 from above, numeral 44 indicates an upper cowl, numeral 45 indicates a middle cowl, numeral 46 indicates a lower cowl, numeral 48 indicates a radiator and numeral 49 indicates a tank cover.

Figure 2:
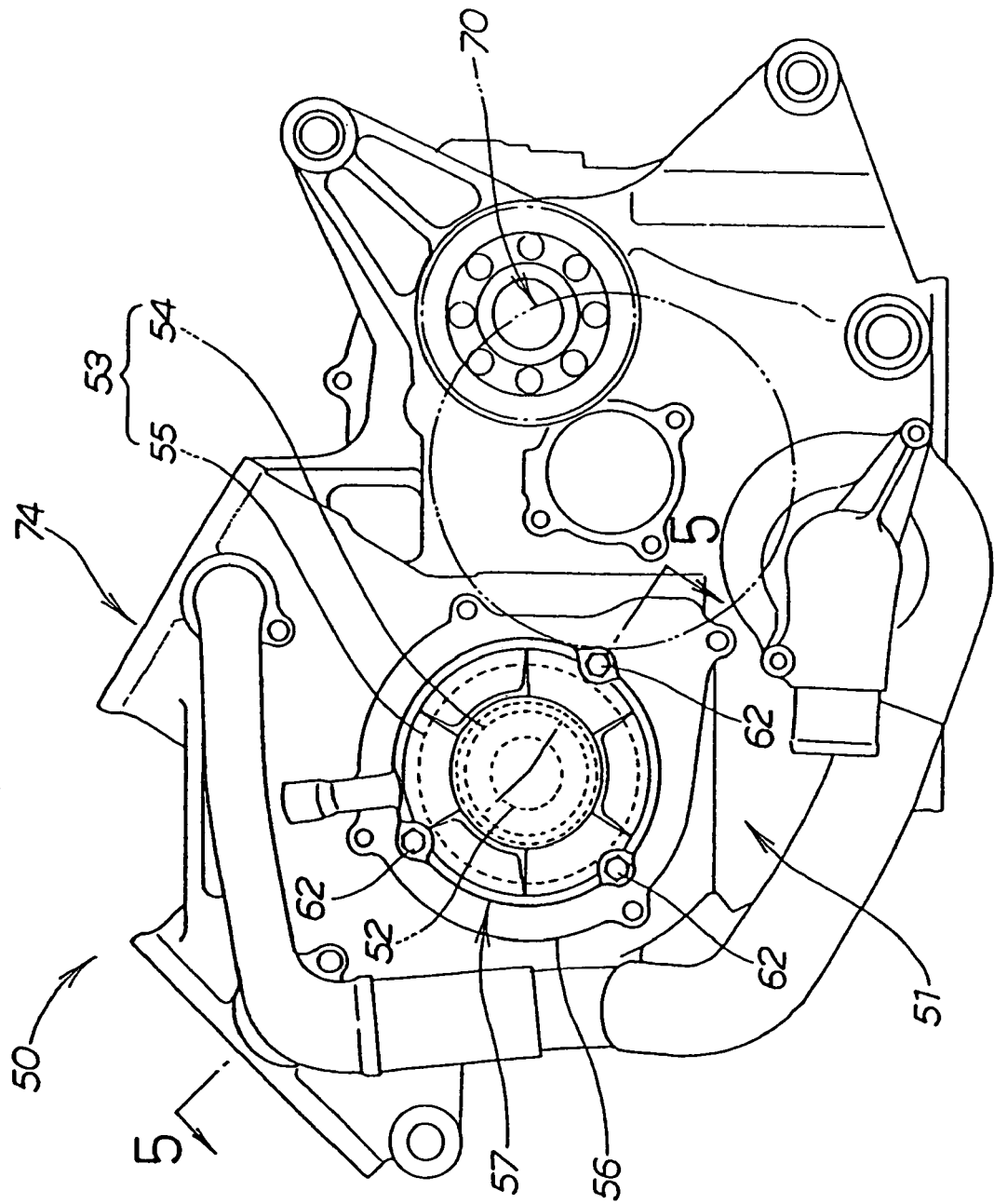
FIG. 2 is an enlarged side view of the accessory-use cover structure of the motorcycle according to the present invention.

FIG. 2 is a side view of an accessory-use cover structure of the motorcycle according to the present invention. In the accessory-use cover structure 50 of the motorcycle, a crankshaft 52 which constitutes a power shaft is rotatably supported on a crankcase 51 of the engine 13 and a rotor 54 side of an AC generator 53 which constitutes an accessory is mounted on the crankshaft 52. Further, a stator 55 of the AC generator 53 is mounted on the crankcase 51. The AC generator 53 is covered with a cover 56 and an overcover 57 is attached to the cover 56.

Figure 3:
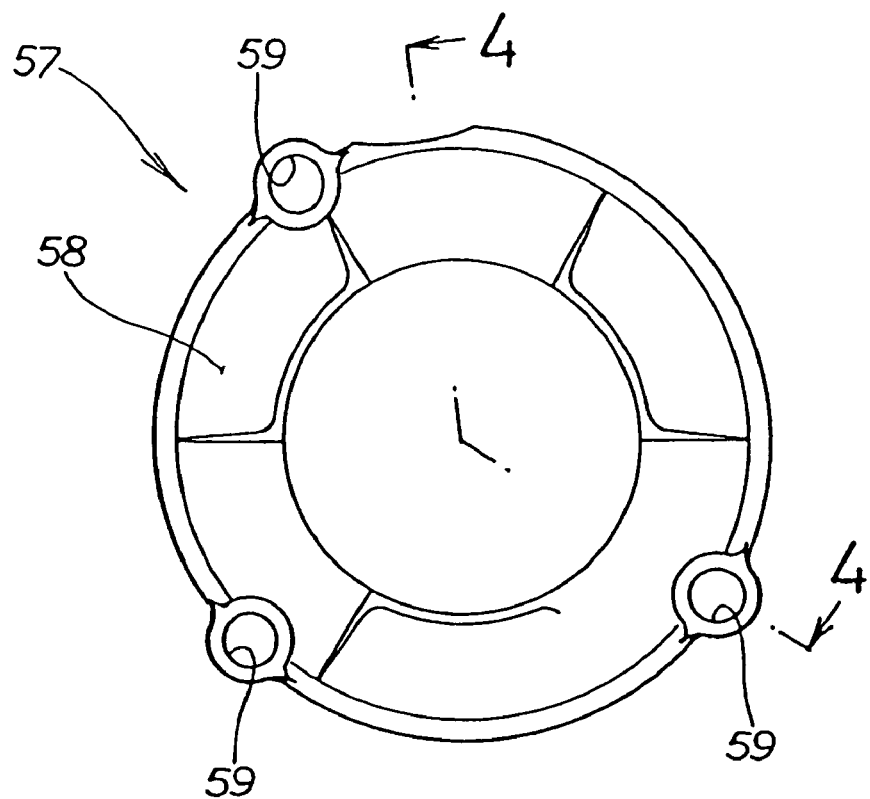
FIG. 3 is a front view of an overcover of the accessory-use cover structure of the motorcycle according to the present invention.
Figure 4:
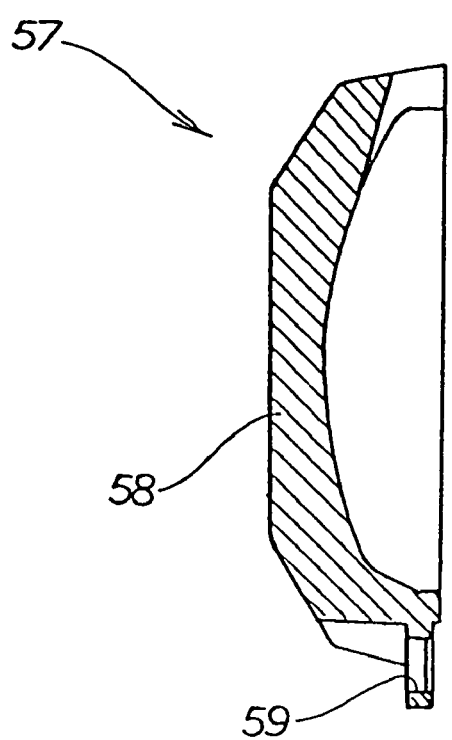
FIG. 4 is a cross-sectional view taken along a line 4—4 in FIG. 3.

FIG. 3 is a front view of the overcover which is adopted by the accessory-use cover structure of the motorcycle according to the present invention and FIG. 4 is a cross-sectional view taken along a line 4—4 in FIG. 3.

The overcover 57 includes an overcover body 58 and mounting holes 59 formed in the overcover body 58 for enabling fastening of the overcover 57 to the cover 56 (see FIG. 2) and is formed of resin by molding. That is, by adopting the resin-made overcover 57, it is possible to realize a light-weight overcover 57. As a result, it is possible to suppress the increase of weight of the vehicle body to a minimum.

Figure 5:
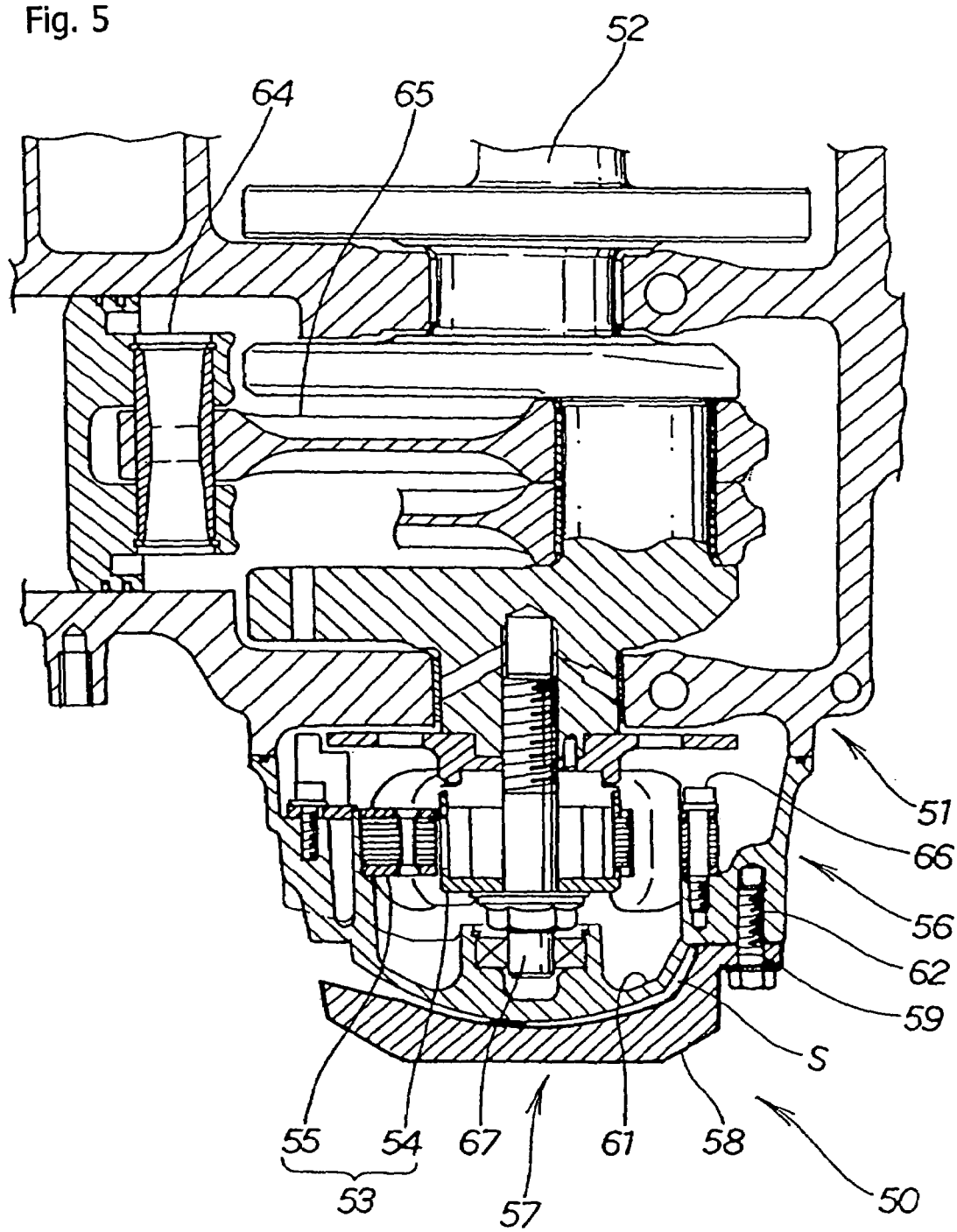
FIG. 5 is a cross-sectional view taken along a line 5—5 in FIG. 2.

FIG. 5 is a cross-sectional view taken along a line 5—5 in FIG. 2 and shows the inner structure of the accessory-use cover structure 50 of the motorcycle. The crankshaft 52 is arranged in the widthwise direction of the body frames (vehicle body) 12 and numeral 56 indicates a member which is formed in a bowl shape for defining a recessed portion 61 in the inside thereof.

Further, the overcover 57 is shown in a state that the overcover 57 is fixed to the cover 56 by bolts 62 (only one bolt shown in the drawing) while ensuring a given gap S with respect to the cover 56.

In the drawing, numeral 64 indicates a piston of the engine 13, numeral 65 indicates a connecting rod of the engine 13, numeral 66 indicates bolts for fixing the stator 55 of the AC generator 53 to the crankcase 51, and numeral 67 indicates bolts for fixing the rotor 54 of the AC generator 53 to the crankshaft 52.

With the accessory-use cover structure 50 of the motorcycle, it is understood that in the motorcycle 10 (see FIG. 1) which mounts the engine 13 on the body frames (vehicle body) 12, mounts the AC generator (accessory) 53 on one end of the crankshaft (power shaft) 52 which transmits power to the rear wheel 17 (see FIG. 1) from the engine 13, and covers the AC generator 53 with the cover 56, the overcover 57 which covers a surface of the cover 56 is attached to the cover 56.

For example, in an engine of a type in which the engine is a multi-cylinder engine and an accessory is mounted on one end of a power transmission shaft or a power shaft of the engine, a crankcase has the large-width structure and hence, flaws or the like are liable to be generated on a cover which covers the accessory. Accordingly, it is preferable to adopt the structure that can easily cope with the generation of flaws or the like.

Accordingly, the overcover 57 that covers the surface of the cover 56 is attached to the cover 56. By attaching the overcover 57 that covers the surface of the cover 56 to the cover 56, it is possible to protect the cover 56 and to prevent the cover 56 from being damaged during storage. Further, when flaws are generated on the overcover 57, it is possible to perform a repairing operation by merely exchanging only the overcover 57 that is relatively cheap.

The accessory-use cover structure 50 of the motorcycle may be also understood as the structure in which the overcover 57 is mounted on the cover 56 with a given gap S therebetween.

By mounting the overcover 57 on the cover 56 with the given gap S therebetween, when the heat is generated from the cover 56 side, for example, it is possible to interrupt the heat transmitted from the cover 56. Further, it is also possible to introduce a cruising wind into the given gap S, whereby it is possible to enhance the radiation of the heat generated by the cover 56 without damaging the ventilating property.

Further, the accessory-use cover structure 50 of the motorcycle may be also understood as the structure which forms the recessed portion for reducing the operating sound generated from the AC generator (accessory) 53 in the inside of the cover 56.

By forming the recessed portion 61 which can reduce the operating sound generated by the AC generator 53 in the inside of the cover 56, it is possible to make the operation of the motorcycle 10 (see FIG. 1) relatively quiet or silent.

Still further, the accessory-use cover structure 50 of the motorcycle may be also understood as the structure which arranges the crankshaft (the power shaft) 52 in the widthwise direction of the body frames (vehicle body) 12.

By arranging the crankshaft 52 in the widthwise direction of the body frames 12, it is possible to arrange the AC generator (accessory) 53 at the left end portion or the right end portion of the body frames (vehicle body) 12. As a result, the maintenance performance of the AC generator 53 can be enhanced and, at the same time, it is possible to design the vehicle such that a total length of the vehicle can be shortened.

Figure 6:
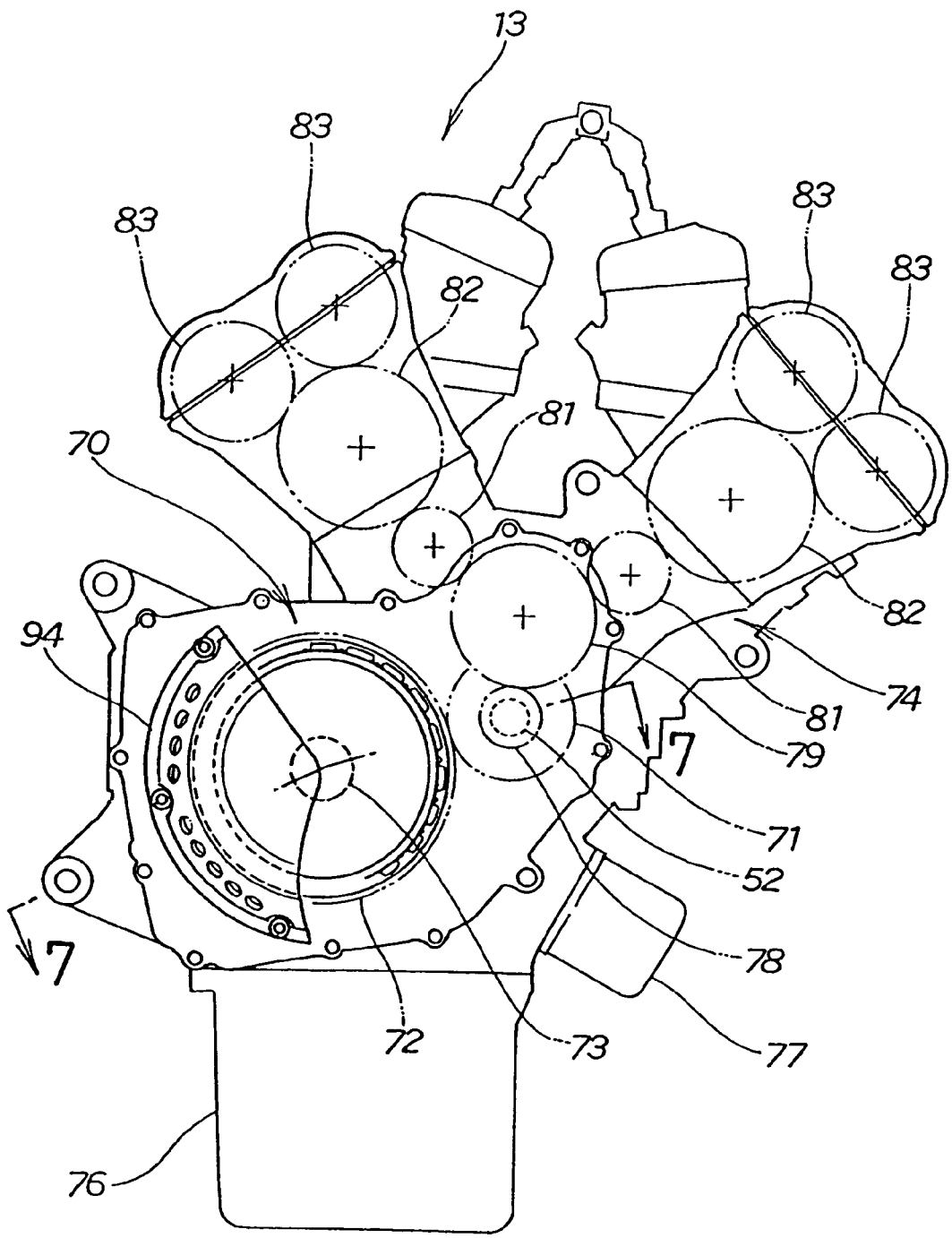
FIG. 6 is a right side view of an engine that arranges an embodiment of a dry multi-disc clutch according to the present invention.

Next, a dry multi-disc clutch 70 which is arranged at the right side of the motorcycle 10 (see FIG. 1) is explained. FIG. 6 is a right side view of the engine that arranges the dry multi-disc clutch according to the present invention, wherein Fr indicates a front side of the vehicle and Rr indicates a rear side of the vehicle.

The dry multi-disc clutch 70 is a member which is interposed between a primary gear 72 which is connected to the crankshaft 52 by way of a drive gear 71 and constitutes a drive side and a main shaft 73 which constitutes a driven side so as to transmit the power from the crankshaft 52 to the main shaft 73 (a connected state) or to cut off the transmission of the power from the crankshaft 52 (a separated state).

In the drawing, numeral 74 indicates a cylinder block, numeral 76 indicates an oil pan, numeral 77 indicates an oil filter, numeral 78 indicates a valve open/close gear which is mounted on the crankshaft 52, numeral 79 indicates a governing gear which governs open/close timings of a valve (not shown in the drawing), numeral 81 indicates a first gear which is meshed with the governing gear 79, numeral 82 indicates a second gear which is meshed with the first gear 81 and numeral 83 indicates a timing gear which opens or closes the valve (not shown in the drawing).

Figure 7:
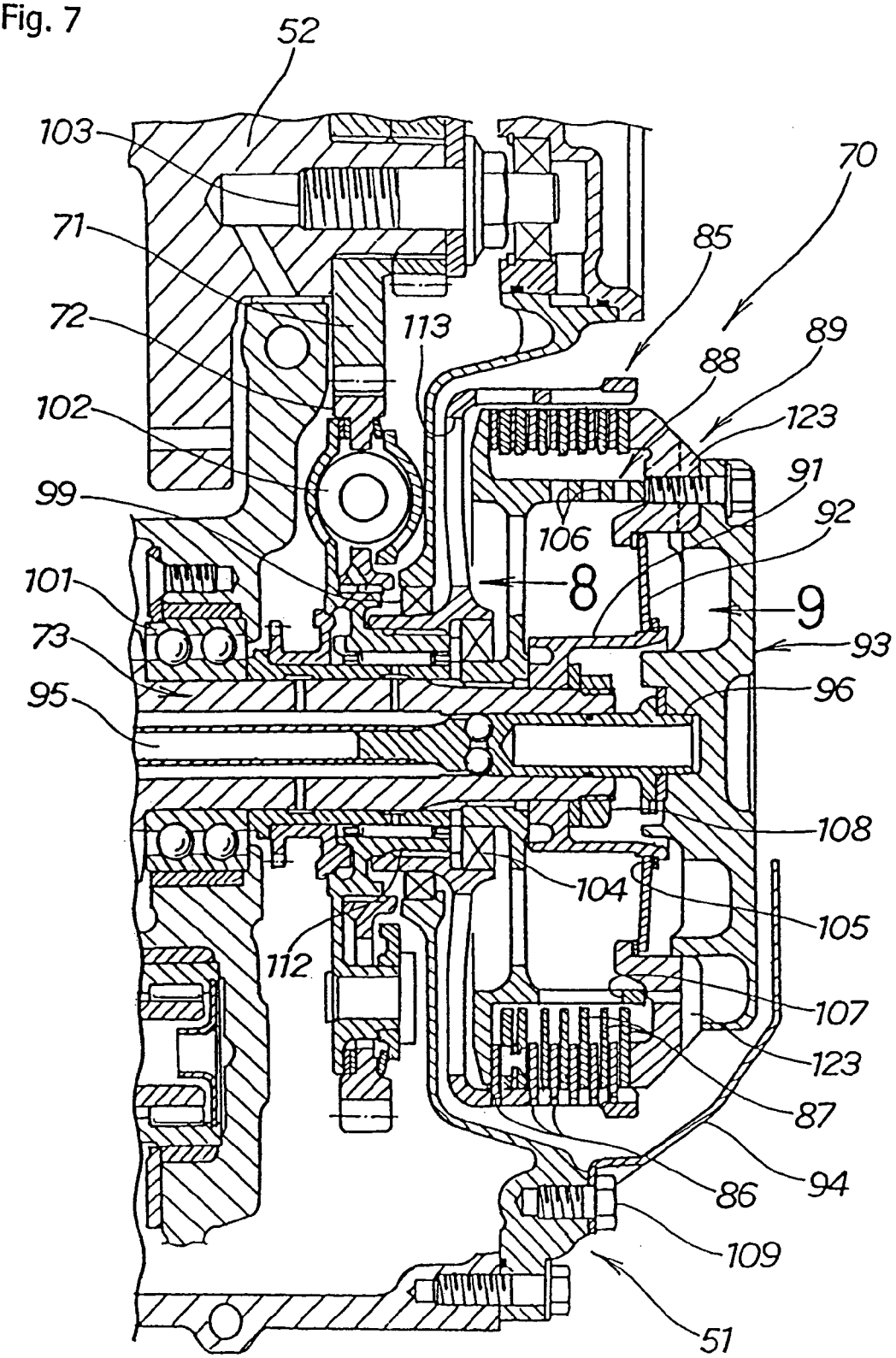
FIG. 7 is a cross-sectional view taken along a line 7—7 in FIG. 6.

FIG. 7 is a cross-sectional view taken along a line 7—7 in FIG. 6 and shows a cross section of the dry multi-disc clutch. The dry multi-disc clutch 70 is a mechanism which is substantially constituted of a primary gear 72 which transmits power of the crankshaft 52, a clutch outer 85 at the drive side which is in a spline engagement with the primary gear 72, a plurality of drive-side friction discs 86 which are engaged with the clutch outer 85 as friction discs, driven-side friction discs 87 which are alternately overlapped to these drive-side friction discs 86 as friction discs, a clutch center 88 at the driven side with which the driven-side friction discs 87 are engaged, the main shaft 73 on which the clutch center 88 is mounted, and a pressure plate 89 which enables the transmission of power from the clutch outer 85 to the clutch center 88 by pushing the drive-side friction discs 86 and the driven-side friction discs 87, a clutch center guide 91 which regulates the axial movement of the clutch center 88 by being engaged with the main shaft 73, a diaphragm spring 92 which is interposed between the clutch center guide 91 and the pressure plate 89 so as to bias the pressure plate 89 toward the clutch outer 85 side, a clutch lifter plate 93 which is integrally mounted on the pressure plate 89, and a clutch cover 94 which covers the clutch lifter plate 93.

The dry multi-disc clutch 70 is usually held in a transmission state (a clutch connected state) by biasing the pressure plate 89 to the clutch outer 85 side using the diaphragm spring 92 so as to bring the drive-side friction discs 86 and the driven-side friction discs 87 in close contact with each other. Further, to bring the dry multi-disc clutch 70 into a power non-transmission state (a clutch separated state), a hydraulic pressure is applied to a lifter 96 through a penetrating portion 95 formed in the main shaft 73 thus making the lifter 96 move the pressure plate 89 toward the clutch cover 94 side. Accordingly, the pressure of the pressure plate 89 which is applied to the drive-side friction discs 86 and the driven-side friction discs 87 is reduced and hence, a slip is generated between the drive-side friction discs 86 and the driven-side friction discs 87.

The dry multi-disc clutch 70 is understood as a clutch that arranges the clutch outer 85 and the pressure plate 89 outside the crankcase 51 of the engine 13. By arranging the clutch outer 85 and the pressure plate 89 outside the crankcase 51 of the engine 13, it is possible to arrange the whole clutch in a spaced-apart manner from the crankcase 51 of the engine 13. As a result, the dry multi-disc clutch 70 can have the structure that hardly receives the influence of the heat transmitted from the engine 13.

In the drawing, numeral 99 indicates an oil seal which seals the crankcase 51 and the clutch outer 85, numeral 101 indicates a bearing which rotatably mounts the main shaft 73 therein, numeral 102 indicates a damper which attenuates a shock at the time of connecting the clutch by interposing the primary gear 72, numeral 103 indicates bolts for mounting the drive gear 71 on the crankshaft 52, numeral 104 indicates an oil seal which seals the clutch outer 85 and the clutch center 88, numeral 105 indicates a support portion which is formed on the clutch center 88 for supporting the diaphragm spring 92, numerals 106, 107 are ventilation holes which are formed in the clutch center 88 for allowing a flow of air therethrough, numeral 108 indicates a nut which supports the clutch center guide 91 on the main shaft 73, and numeral 109 indicates a bolt which fastens the clutch cover 94 to the crankcase 51 side.

Figure 8:
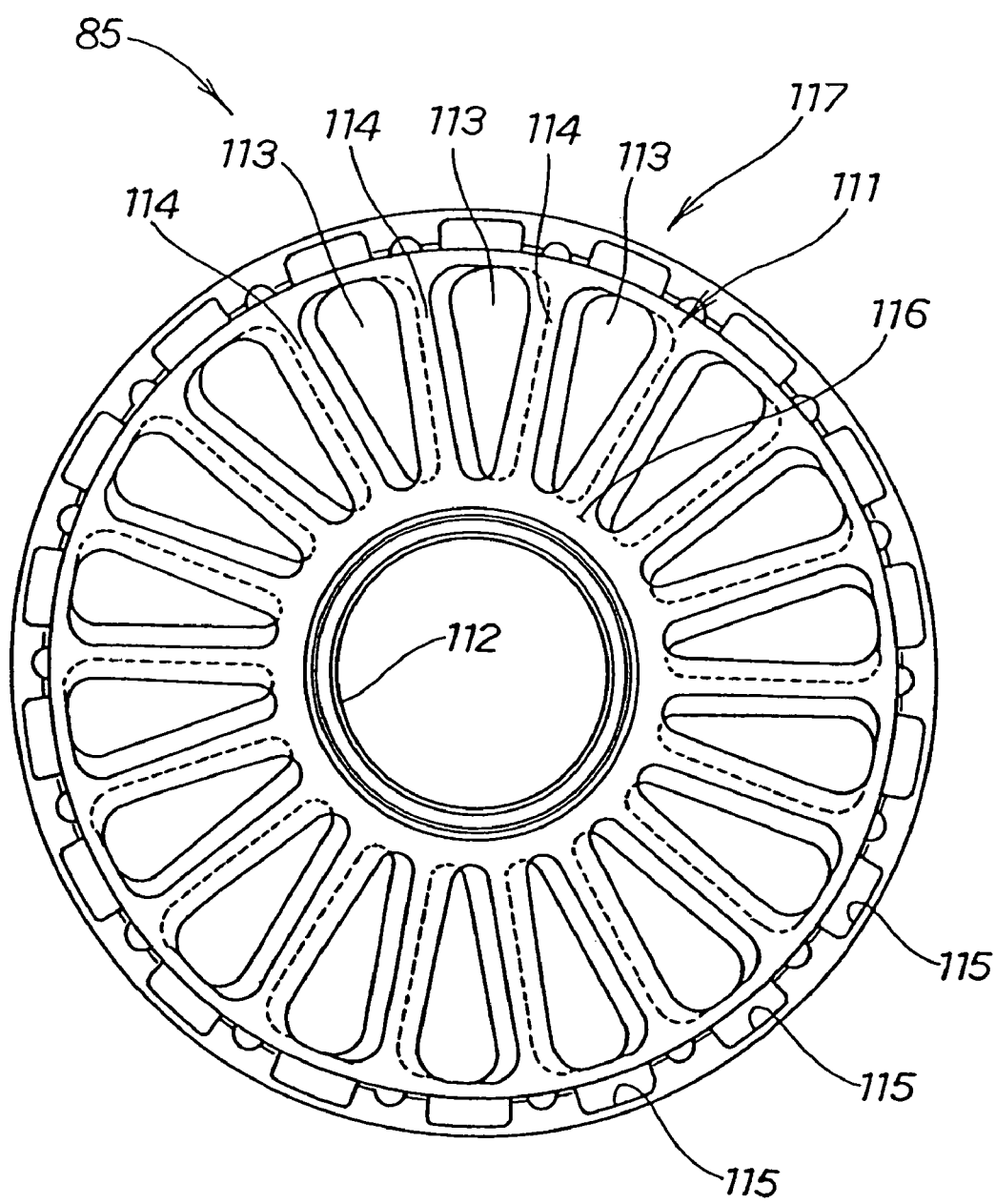
FIG. 8 is a view as viewed in an arrow direction indicated by 8 in FIG. 7.
Figure 11:
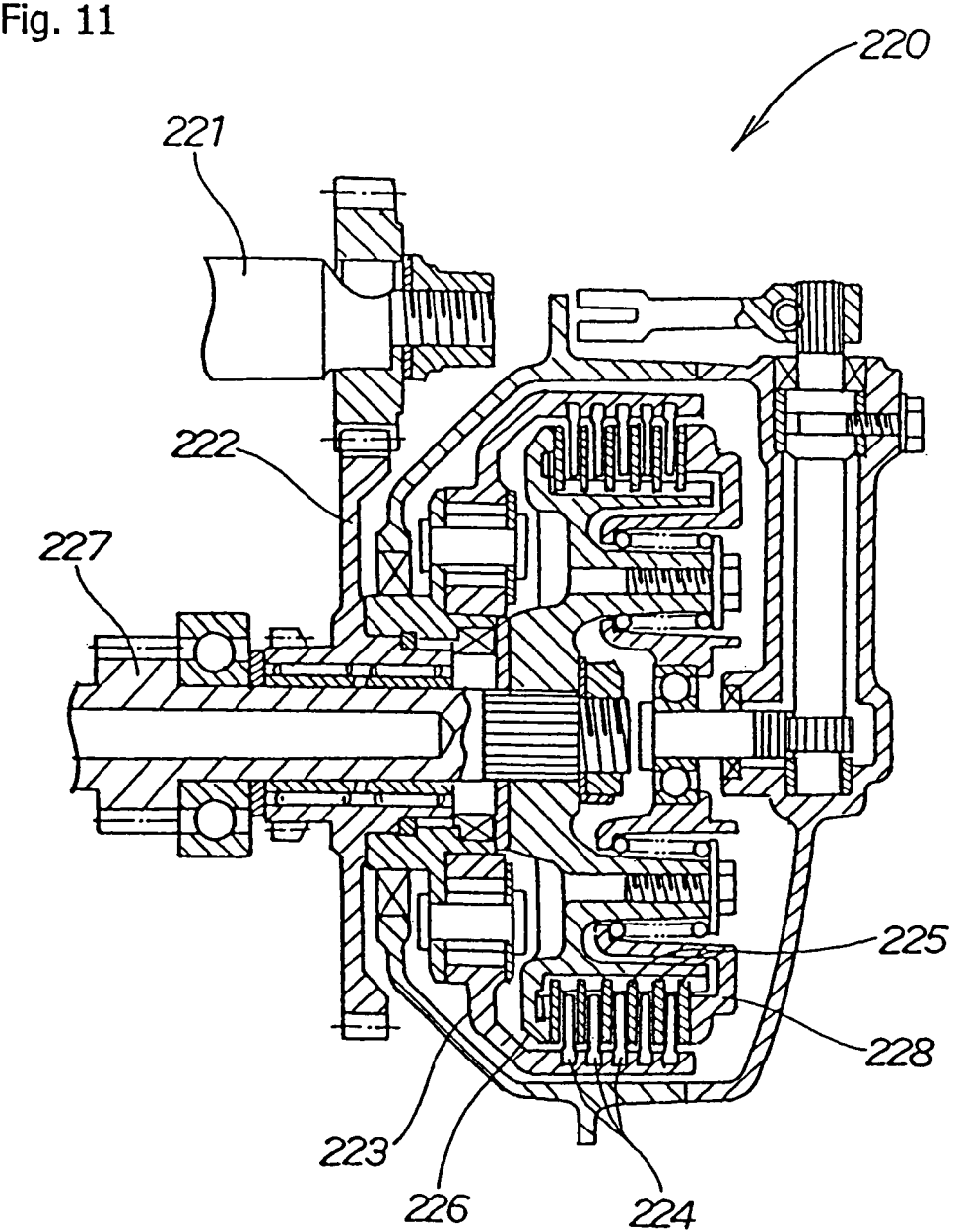
FIG. 11 is a view reproducing FIG. 3 of Japanese Patent Publication 2864396.

FIG. 8 is a view as viewed in an arrow direction indicated by 8 in FIG. 7 and is also a plan view of the clutch outer 85 of the dry multi-disc clutch 70 (see FIG. 7). The clutch outer 85 includes an approximately cylindrical body portion 111 which houses a plurality of drive-side friction discs 86 (see FIG. 7), a spline portion 112 which is fitted in the primary gear 72 (see FIG. 7), a plurality of openings 113 which enable the communication of air, a plurality of fins 114 which enhance the flow of air through these openings 113, and a plurality of fitting portions 115 which allow fitting of the drive-side friction discs 86 therein.

In other words, the clutch outer 85 is understood as the structure which forms an axial fan 117 in which a plurality of openings 113 which are inclined with respect to a bottom 116 of the approximately cylindrical body portion 111 are formed and leaves a plurality of fins 114 and hence, it is possible to increase an inflow quantity of air at a low speed rotation and, at the same time, it is possible to enhance the flow of air from the inside of the body portion 111 to the outside.

That is, by forming the fins 114 on the clutch outer 85, it is possible to radiate the friction heat in a space defined between the clutch outer 85 and the crankcase 51 and, at the same time, it is possible to discharge wear powder. For example, this structure becomes advantageous in an arrangement that provides a large space at the clutch outer 85 side.

Further, by forming the fins 114 at the clutch outer 85 side into a fin shape with which the axial fan 117 is formed, it is possible to enhance the radiation of heat when the clutch outer 85 is rotated at a low speed. It is generally known that an axial fan exhibits favorable air discharge efficiency-at the time of low-speed rotation. The clutch outer 85 is a member that is always rotated during the starting of engine 13 (see FIG. 1) and can enhance the radiation of heat of the dry multi-disc clutch 70 particularly at the time of idling in which the engine 13 is rotated at a low speed.

FIG. 9 is a view as viewed in an arrow direction indicated by 9 in FIG. 7 and is also a plan view of the pressure plate 89 of the dry multi-disc clutch 70. The pressure plate 89 includes an approximately ring-like body portion 121, a receiving portion 122 that is formed in an inner periphery of the body portion 121 for receiving the diaphragm spring 92, a plurality of passages 123 which enable the communication of air, and a plurality of fins 124 which enhance the flow of air through these passages 123.

In other words, the pressure plate 89 is understood as the structure which forms a centrifugal fan 127 capable of increasing an inflow quantity of air at a high speed rotation and, at the same time, capable of enhancing the flow of air in the direction from the inner periphery to an outer periphery of the body portion 121 by adopting the structure in which a plurality of passages 123 are formed in the approximately ring-like body portion 121 in an inclined manner with respect to the radial direction while leaving a plurality of fins 124.

That is, by forming the fins 124 on the pressure plate 89, it is possible to radiate the friction heat in an outer space defined at the pressure plate 89 side and, at the same time, it is possible to discharge wear powder. For example, this structure becomes advantageous in an arrangement that provides a large space at the pressure plate 89 side.

Further, by forming the fins 124 at the pressure plate 89 side into a fin shape with which the centrifugal fan 127 is formed, it is possible to enhance the radiation of heat when the pressure plate 89 is rotated at a high speed. It is generally known that a centrifugal fan exhibits favorable air discharge efficiency at the time of high-speed rotation. The pressure plate 89 is rotated during cruising and can enhance the radiation of heat of the dry multi-disc clutch 70 particularly at the time of cruising in which the engine 13 (see FIG. 1) is rotated at a high speed.

The manner of operation of the dry multi-disc clutch 70 described above is explained hereinafter. FIGS. 10(a), (b) are operation explanatory views of the dry multi-disc clutch according to the present invention, wherein FIG. 10(a) shows one example of the air flow when the dry multi-disc clutch 70 is in the separated state and FIG. 10(b) shows one example of the air flow when the dry multi-disc clutch 70 is in the connected state.

In FIG. 10(a), the dry multi-disc clutch 70 is in the separated state and hence, the primary gear 72 and the clutch outer 85 are rotated, while the drive-side friction discs 86, the driven-side friction discs 87, the clutch center 88, the pressure plate 89, the clutch lifter plate 93 and the main shaft 73 are stopped.

Accordingly, it is possible to expect the airflow generated by the axial fan 117 (see FIG. 8) formed on the clutch outer 85. That is, since the dry multi-disc clutch 70 is in the separated state, it is possible to make the air flow into the dry multi-disc clutch 70 through gaps between the drive-side friction discs 86 and the driven-side friction discs 87 as indicated by arrows a1, a2 and to make the air flow out from the dry multi-disc clutch 70 through the openings 113. At the same time, it is possible to make the air flow into the dry multi-disc clutch 70 through the passages 123 of the pressure plate 89 in the stopped state as indicated by arrows a3, a4.

Here, the dry multi-disc clutch 70 being in the separated state means the idling state in which engine 13 (see FIG. 1) is rotated at a low speed. Since the axial fan 117 (see FIG. 8) which can increase an inflow quantity of air at the low-speed rotation and can enhance the flow of air from the inside to the outside of the body portion 111 can be formed on the clutch outer 85, it is possible to enhance the radiation of heat of the dry multi-disc clutch 70 at the time of idling.

In FIG. 10(b), the dry multi-disc clutch 70 is in the connected state and hence, all of the primary gear 72, the clutch outer 85, the drive-side friction discs 86, the driven-side friction discs 87, the clutch center 88, the pressure plate 89, the clutch lifter plate 93 and the main shaft 73 are being rotated.

Firstly, due to the axial fan 117 (see FIG. 8) which is formed on the clutch outer 85 and the centrifugal fan 127 (see FIG. 9) which is formed on the pressure plate 89, it is considered that the large negative pressure is generated in the inside of the dry multi-disc clutch 70. Secondly, the dry multi-disc clutch 70 being in the connected state means that the motorcycle (vehicle) 10 is cruising and hence, it is possible to expect the heat radiation effect generated by a cruising wind during cruising.

That is, by making use of the negative pressure and the cruising wind, it is possible to discharge the air which is made to flow into the dry multi-disc clutch 70 through gaps between the parts such as the clutch outer 85, the clutch center 88, the pressure plate 89 or the like as indicated by an arrow b1 from the openings 113 formed in the clutch outer 85 as indicated by an arrow b2 and, at the same time, it is possible to discharge the air which is made to flow into the dry multi-disc clutch 70 as indicated by the arrow b1 from the passages 123 formed in the pressure plate 89 as indicated by arrows b3, b4.

When the dry multi-disc clutch 70 is in the connected state, the axial fan 117 (see FIG. 8) can be formed in the clutch outer 85 and hence, it is possible to enhance the radiation of heat during the low-speed cruising of the vehicle and, at the same time, the centrifugal fan 127 (see FIG. 9) can be formed on the pressure plate 89 and hence, it is possible to enhance the radiation of heat during the high-speed cruising of the vehicle. As a result, it is possible to rapidly discharge or expel the friction heat and the wear powder that is generated from the drive-side friction discs 86 and/or the driven-side friction discs 87 when the dry multi-disc clutch 70 is connected.

That is, the dry multi-disc clutch 70 is understood as the structure in which a plurality of friction discs 86, 87 are interposed between the drive-side clutch outer 85 and the driven-side clutch center 88 and power is transmitted from the clutch outer 85 to the clutch center 88 by pushing these friction discs 86, 87 using the pressure plate 89, wherein the fins 114, 124 which enhance the flow of air are formed on the clutch outer 85 and the pressure plate 89 and, at the same time, openings 113 or passages 123 which allow the communication of air are formed in the clutch outer 85 and the pressure plate 89.

For example, the efficient radiation of the friction heat which is generated when the clutch is connected and the heat that is transmitted from the engine and the discharge of the wear powder that is generated when the clutch is connected are desirable to stabilize the clutch performance.

Accordingly, the fins 114, 124 that enhance the flow of air are formed on the clutch outer 85 and the pressure plate 89 and, at the same time, the openings 113 or the passages 123 which enable the communication of air are formed in the clutch outer 85 and the pressure plate 89.

That is, by forming the fins 114, 124 which enhance the flow of air on the clutch outer 85 and the pressure plate 89 and, at the same time, by forming the openings 113 or the passages 123 which enable the communication of air in the clutch outer 85 and the pressure plate 89, it is possible to efficiently radiate the friction heat which is generated when the dry multi-disc clutch 70 is connected and the heat which is transmitted from the engine 13 (see FIG. 1) and, at the same time, it is possible to discharge the wear powder which is generated when the dry multi-disc clutch 70 is connected. As a result, it is possible to ensure the stabilization of the clutch performance.

Here, in the above-mentioned embodiment, as shown in FIG. 5, the explanation has been made with respect to the case in which the AC generator is used as the accessory. However, the accessory is not limited to the AC generator and includes the general auxiliary machines. As a result, it is possible to expand the degree of freedom of the layout of the accessory.

Also, in the above-mentioned embodiment, as shown in FIG. 5, the explanation has been made with respect to the case in which the overcover 57 is the cover which covers the cover 56 of the AC generator 53. However, the overcover 57 is not limited to such a cover and may be mounted on a clutch cover of the dry multi-disc clutch 70 shown in FIG. 7 or the like.

In the embodiment, as shown in FIG. 5, the AC generator 53 is mounted on one end of the crankshaft (the power shaft) 52. However, mounting of the AC generator 53 is not limited to such a mode and the AC generator 53 may be mounted on one end of a power transmission shaft that transmits power from the power shaft to the rear wheel.

In the embodiment, as shown in FIG. 1, the vehicle that mounts the dry multi-disc clutch 70 is the motorcycle 10. However, the vehicle is not limited to the motorcycle and may be a two-wheeled vehicle, a three-wheeled vehicle or a four-wheeled vehicle.

In the embodiment, as shown in FIG. 8 and FIG. 9, the fins 114 formed on the clutch outer 85 are formed into the axial fan 117 and the fins 124 formed on the pressure plate 89 are formed into the centrifugal fan 127. However, the present invention is not limited to such an embodiment and the fins formed on the clutch outer may be formed into a centrifugal fan and the fins formed on the clutch center may be formed into an axial fan.

Further, both of the fins formed on the clutch outer and the fins formed on the clutch center may be formed into centrifugal fans or both of the fins formed on the clutch outer and the fins formed on the clutch center may be formed into axial fans.

That is, in forming the fins into the fin shape with which the axial fan or the centrifugal fan is constituted, by forming the fins which constitute the axial fan, it is possible to enhance the radiation of heat when the clutch outer or the pressure plate is rotated at the low speed. Further, by forming the fins that constitute the centrifugal fan, it is possible to enhance the radiation of heat when the clutch outer or the pressure plate is rotated at the high speed.

Due to the above-mentioned constitutions, the present invention exhibits following advantageous effects. According to the first aspect of the present invention, by forming the fins which enhance the flow of air on the clutch outer and/or the pressure plate and, at the same time, by forming openings or passages which allow the communication of air in the clutch outer and the pressure plate, it is possible to efficiently radiate the friction heat which is generated when the clutch is connected and the heat transmitted from the engine and, at the same time, it is possible to discharge the wear powder which is generated when the clutch is connected. As a result, it is possible to stabilize the clutch performance.

According to the second aspect of the present invention, by forming the fins on the clutch outer, it is possible to radiate the friction heat and to discharge the wear powder to an external space at the clutch outer side. For example, this constitution is advantageous in the arrangement that defines a large space at the clutch outer side.

According to the third aspect of the present invention, by forming the fins on the pressure plate, it is possible to radiate the friction heat and to discharge the wear powder to an external space at the pressure plate side. For example, this constitution is advantageous in the arrangement that defines a large space at the pressure plate side.

According to the fourth aspect of the present invention, by disposing the clutch outer and the pressure plate outside the crankcase of the engine, it is possible to arrange the whole clutch in a spaced-apart manner from the crankcase of the engine. As a result, it is possible to make the dry multi-disc clutch have the structure that hardly receives the influence of the heat transmitted from the engine.

According to the fifth aspect of the present invention, by forming the fins into a fin shape with which the fins constitute the axial fan or the centrifugal fan, it is possible to enhance the radiation of heat when the clutch outer or the pressure plate is rotated at a low speed. Further, by forming the fins into a fin shape with which the fins constitute the centrifugal fan, it is possible to enhance the radiation of heat when the clutch outer or the pressure plate is rotated at a high speed.

According to the sixth aspect of the present invention, by forming the fins at the clutch outer side into the fin shape with which the fins constitute the axial fan, it is possible to enhance the radiation of heat when the clutch outer is rotated at a low speed. That is, the clutch outer is a member which is always rotated during starting of the engine and hence, it is possible to enhance the radiation of heat in the inside of the clutch particularly at the time of idling when the engine is rotated at a low speed.

According to the seventh aspect of the present invention, by forming the fins at the pressure plate side into the fin shape with which the fins constitute the centrifugal fan, it is possible to enhance the radiation of heat when the pressure plate is rotated at a high speed. That is, the pressure plate is rotated during cruising and hence, it is possible to enhance the radiation of heat in the inside of the clutch particularly during cruising when the engine is rotated at a high speed.

Although the present invention has been described herein with respect to a specific illustrative embodiment thereof, the foregoing description is intended to be illustrative, and not restrictive. Those skilled in the art will realize that many modifications of the embodiment could be made within the spirit and essence of the invention. All such modifications are intended to be within the scope of the present invention as claimed.

What is claimed is:

1. A dry multi-disc clutch in which a plurality of friction discs are interposed between a drive-side clutch outer member and a drive-side clutch center member, and power is transmitted from the clutch outer member to the clutch center member by pushing the friction discs using a pressure plate, wherein:
    fins that enhance a flow of air are formed on both of the clutch outer member and the pressure plates, and plural passages which allow the communication of air are formed in both the clutch outer member and the pressure plate, such that the clutch outer member is configured to act as an axial fan, and the pressure plate is configured to act as a centrifugal fan, wherein a portion of the clutch outer member forming the axial fan and a portion of the pressure plate forming the centrifugal fan are substantially parallel, and wherein the plurality of friction discs are disposed between the centrifugal fan and the axial fan.

2. A dry multi-disc clutch according to claim 1, wherein the clutch outer member and the pressure plate are disposed on a vehicle outside a crankcase of an engine of the vehicle.

3. A dry multi-disc clutch according to claim 1, provided on a motorcycle.

4. The dry multi-disc clutch of claim 1 wherein
    the clutch outer member is configured to form an axial fan by means of plural elongate outer member openings formed on a radially extending base portion of the clutch outer member, each outer member opening extending radially from a center of the base portion to the periphery of the base portion, the outer member openings arranged side-by-side in the circumferential direction of the clutch outer member so that the portions of the clutch outer member between the outer member openings form outer member fins, and wherein the outer member openings further comprise an inclination relative to an axial direction of the clutch.

5. The dry multi-disc clutch of claim 1 wherein
    the pressure plate comprises an annular body portion and is configured to form a centrifugal fan by means of plural elongate pressure plate fins, each pressure plate fin extending axially outward from a side face of the body portion, each pressure plate fin extending from an inner peripheral edge of the body portion to an outer peripheral edge of the body portion along a curved line such that an outer peripheral end of each fin is circumferentially offset from inner peripheral end of that fin, the spaces between the pressure plate fins forming air flow passages.

6. The dry multi-disc clutch of claim 5 wherein the clutch further comprises a diaphragm spring disposed on the inner peripheral edge of the annular body portion, the diaphragm spring biasing the pressure plate toward the clutch outer member.

7. A dry multi-disc clutch comprising:
    a clutch axis;
    a drive-side clutch outer member;
    a driven-side clutch center member;
    a plurality of friction discs interposed between said drive-side clutch outer member and said driven-side clutch center member; and
    a pressure plate which pushes the friction discs to transmit power from the clutch outer member to the clutch center member; wherein
    the clutch outer member is configured to form an axial fan by means of plural elongate outer member openings formed on a radially extending base portion of the clutch outer member, each outer member opening extending radially from a center of the base portion to the periphery of the base portion, the outer member openings arranged side-by-side in the circumferential direction of the clutch outer member so that the portions of the clutch outer member between the outer member openings form outer member fins,
    the pressure plate comprises an annular body portion and is configured to form a centrifugal fan by means of plural elongate pressure plate fins, each pressure plate fin extending axially outward from a side face of the body portion, each pressure plate fin extending from an inner peripheral edge of the body portion to an outer peripheral edge of the body portion along a curved line such that an outer peripheral end of each fin is circumferentially offset from inner peripheral end of that fin, the spaces between the pressure plate fins forming air flow passages, and
    wherein the clutch further comprises a diaphragm spring disposed on the inner peripheral edge of the annular body portion, the diaphragm spring biasing the pressure plate toward the clutch outer member.

8. The dry multi-disc clutch of claim 7 wherein the outer member openings further comprise an inclination relative to the axial direction.

* * * * *